(12) United States Patent
Agrawal et al.

(10) Patent No.: US 7,869,349 B2
(45) Date of Patent: Jan. 11, 2011

(54) METHOD AND SYSTEM FOR DEDUCING NETWORK ROUTES BY QUERYING ROUTERS

(75) Inventors: Dakshi Agrawal, Monsey, NY (US); Alina Beygelzimer, White Plains, NY (US); Bong-Jun Ko, Harrington Park, NJ (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/251,094

(22) Filed: Oct. 14, 2008

(65) Prior Publication Data

US 2010/0091685 A1 Apr. 15, 2010

(51) Int. Cl.
*H04L 12/26* (2006.01)
*H04L 12/28* (2006.01)
*G06F 15/173* (2006.01)
*H04L 12/56* (2006.01)

(52) U.S. Cl. ............... 370/225; 370/248; 370/254; 370/395.31; 709/242

(58) Field of Classification Search .......... None
See application file for complete search history.

(56) References Cited

U.S. PATENT DOCUMENTS

| | | | |
|---|---|---|---|
| 6,115,362 A * | 9/2000 | Bosa et al. | 370/248 |
| 6,611,499 B1 * | 8/2003 | D'Souza | 370/252 |
| 6,691,169 B1 * | 2/2004 | D'Souza | 709/242 |
| 6,704,795 B1 | 3/2004 | Fernando et al. | |
| 6,728,214 B1 * | 4/2004 | Hao et al. | 370/241 |
| 6,744,739 B2 | 6/2004 | Martin | |
| 7,035,202 B2 | 4/2006 | Callon | |
| 7,042,837 B1 * | 5/2006 | Cassiday et al. | 370/225 |
| 7,260,645 B2 * | 8/2007 | Bays | 709/238 |
| 7,298,707 B2 * | 11/2007 | Retana et al. | 370/252 |
| 2003/0072270 A1 | 4/2003 | Guerin et al. | |
| 2004/0044786 A1 | 3/2004 | Basso et al. | |
| 2005/0102423 A1 * | 5/2005 | Pelavin et al. | 709/238 |
| 2006/0062154 A1 | 3/2006 | Choy et al. | |
| 2006/0171404 A1 | 8/2006 | Nalawade et al. | |
| 2006/0253606 A1 | 11/2006 | Okuno | |
| 2007/0025355 A1 | 2/2007 | Cohen et al. | |

* cited by examiner

*Primary Examiner*—Gregory B Sefcheck
(74) *Attorney, Agent, or Firm*—Cahn & Samuels LLP

(57) ABSTRACT

A method and system for detecting and correcting invalid network paths in a network having a plurality of routers and a set of global invariant rules imbedded in the network including querying a subset of a routing table data structure defining network paths wherein said subset includes a plurality of routing table entries and comparing a network routing table entry with an earlier network routing table entry for the same node. The method and system also includes detecting inconsistencies between the newer network routing table entry and the earlier network routing table entry, and invalidating the network entries of the older network routing table that are inconsistent with the newer entries. The method and system also includes reconstructing the routing structure by replacing the invalidated network routing table entries with new routing table entries that minimize violation of the invariant protocols.

13 Claims, 4 Drawing Sheets

METHOD AND SYSTEM FOR DEDUCING NETWORK ROUTES BY QUERYING ROUTERS

This invention was made with U.S. Government support under W911NF-06-3-0001 awarded by the U.S. Army. The U.S. Government has certain rights in this invention.

I. FIELD OF THE INVENTION

This invention relates in general to the field of computer systems and network routers and in particular to the field of detecting and filtering invalid routing table entries, and reconstructing those invalid entries in a network environment.

II. DESCRIPTION OF THE PRIOR ART

In network management systems and applications, accurate knowledge of the network paths (or routes) is an essential ingredient to perform various monitoring tasks. Also a network performance monitoring system can take advantage of accurate network route information to select network points to perform end-to-end probing tests to minimize the monitoring over-head. Many of existing network monitoring techniques therefore assume the availability of such information about network paths.

Discovering network paths in a large scale network, however, is not a trivial task. Typically, the set of active routes is a "global" property a network in the sense that a route from a node to another node is a collection of multiple consecutive links across the network. Also, the routes actively used in the network can be time-varying; the state changes in some networking components (e.g., link failure, interface failure, link cost changes, route flapping, etc.) can alter multiple end-to-end routes at any moment. More-over, in many types of operational networks that utilize distributed routing protocols (e.g., OSPF, IS-IS, BGP, etc.), the active routes are typically determined by a distributed decision of a collection of network routers that constitute the entire path, and hence network path discovery task involves the job of collecting information from potentially large set of distributed routers. As the size of the managed network grows, keeping tracking consistent routing information becomes more and more challenging.

U.S. Pat. No. 6,704,795 discloses a technique for reducing the consumption of resources on behalf of a router and its neighboring routers by deferring the point at which the router renders a route selection decision in accordance with a Border Gateway Protocol (BGP). A BGP KEEPALIVE message is selectively issued to enable the router to detect that each of its neighbors has finished sending all of its routes. After detecting that it has received a full set of routes from each neighbor, the router performs route selection procedures to select the preferred routes and advertises these routes to its neighbors.

U.S. Pat. No. 6,744,739 discloses a method and system for obtaining IGP network information useful in determining network routing topologies. The method involves querying a router for its router identifier and all its area identifiers, counting the router's number of area identifiers to determine whether the router is an ABR or an ASBR, and querying the router's link state database for the lowest area identifier on the router. The method further involves importing all Type 1 and Type 2 LSAs for that area into the database of a network discovery software engine, importing from the router's link state database only those networks outside the router's autonomous system that are also directly connected to an ASBR, then moving to the next highest area identifier in the router's database to repeat importing Type 1 and Type 2 LSAs for that area into the database. Next, the method involves importing from the router's link state database only those networks outside the router's autonomous system that are also directly connected to an ASBR. This process is repeated until there are no more areas on the router that have not been processed. Then, starting with the lowest area identifier discovered, all networks in the area making LSAs other than Type 1 or Type 2 are swept. The entire process is repeated for every router discovered.

U.S. Pat. No. 7,035,202 discloses a system and method for accelerating the convergence of routing information after a network fault, by sending ling failure messages through a network. The link failure messages reduce the oscillations in routing information stored by routers, which otherwise can cause significant problems, including intermittent loss of network connectivity as well as increased packet loss and latency. More particularly, upon detecting a network fault, a router generates link failure information to identify the specific link that has failed. In some types of systems, the router communicates the link failure information to neighboring routers as well as a conventional update message withdrawing any unavailable routes. Once other routers receive the link failure information, the routers do not attempt to use routes that include the failed link.

Published U.S. Patent Application 20030072270A1 discloses a method and system for extracting and building end-to-end route information in a two-level, multi-area Internet protocol (IP) autonomous system (AS) operated according to a simple link state routing protocol such as the Integrated System to Integrated System (IS-IS) protocol is disclosed. The method and system enables a user, such as a network administrator, to explicitly identify a full set of paths (links and routers) that a given IP packet would potentially traverse from its entry point in the area of the AS where it originates until its exit point in its intended destination or exit area.

Published U.S. Patent Application No. 20040044786A1 discloses a method and system for reducing the lookup time in packet forwarding on computer networks. A first lookup is performed in a memory tree to find a first protocol forwarding entry in the memory tree. The forwarding entry includes first protocol (e.g., EGP) information and cached associated second protocol (e.g., IGP) information. Both EGP and IGP information are retrievable with the first lookup and used in the determination of an EGP route for the data packet. If the cached IGP information has been invalidated due to address updates, a second lookup can be performed to find an original IGP entry in the memory tree, the information from which can be cached in the EGP forwarding entry if a background maintenance task has finished designating all the EGP entries as having out-of-date caches.

Published U.S. Patent Application No. 20060062154 A1 discloses a method and system for copying data components between nodes of a wireless sensor network. A wireless sensor network comprising a plurality of peer to peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the wireless sensor network can be updated.

Published U.S. Patent Application No. 20060171404 A1 discloses a network data packet routing apparatus with BGP is configured to soft reset an AFI or SAFI, so that forwarding on routes associated with the AFI or SAFI can continue even after an event or error. One approach involves establishing a Border Gateway Protocol (BGP) peering session between a first node and a second node in a packet-switched network; detecting a BGP condition requiring a reset of a BGP address family indicator (AFI) data structure or a sub-address family indicator (SAFI) data structure, wherein the BGP condition does not affect states of routes in the AFI or SAFI; preserving a BGP state and a forwarding state of the AFI or SAFI; and forwarding data on routes represented in the AFI or SAFI. Soft notification messaging and marking routes as stale facilitates the approach.

Published U.S. Patent Application No. 20060253606 A1 discloses a packet transfer apparatus, wherein a larger number of entries can be registered to routing tables without increasing the overall memory volume required for the routing tables to record transfer information of packets. A routing table search is conducted at a high speed. Each line card of the packet transfer apparatus includes two kinds of routing tables, i.e., first and second routing tables having mutually different functions. The first routing tables are local routing tables to record frequently used transfer information in groups. The second routing tables are shared distributed routing tables and record the transfer information in a distributed way without an overlapped part of the transfer information between the line cards. The sum of the distributed transfer information matches the overall transfer information kept in the packet transfer apparatus.

Published U.S. Patent Application No. 20070025355 discloses a system and method for routing validation. In the disclosed method a simulator simulates routing system protocols to build routing tables corresponding to a modeled network, and a comparator compares the routing tables in the actual network to these simulator-created routing tables. Because the modeled system represents a fault-free version of the actual system, and assuming that the modeled routing system protocols are representative of the algorithms used in the actual routers, these simulator-produced routing tables will represent the 'ideal' routing tables that should be present in the routers of the actual network. By querying each router in the actual network for its routing table and comparing each routing table to the corresponding simulator-produced routing table, any differences from the 'ideal' can be identified.

III. SUMMARY OF THE INVENTION

Disclosed is a method for detecting and correcting invalid network paths in a network having a plurality of routers and a set of global invariant rules imbedded in the network including querying a subset of a routing table defining network paths wherein said subset includes a plurality of routing table entries and comparing an older routing table entry with at least one newer routing table entry in the network. The method also includes detecting inconsistencies across at least one routing table entire in the network, and invalidating the older routing table entries that are inconsistent with the newer network routing table entries in the network. The method also includes reconstructing the routing structure by replacing the invalidated network routing table entries with new routing table entries that minimize violation of the invariant rules. Invariant rules are the physical requirements for each network pathway based on the inherent physical properties designed and incorporated into the global network structure.

Also disclosed is a system for detecting and correcting invalid network paths in a network having a plurality of routers and a set of global invariant rules imbedded in the network including at least one processor said processor queries a subset of a routing table defining a plurality of network paths wherein said subset includes a plurality of routing table entries and comparing an older routing table entry with at least one newer routing table entry in the network. The system also includes a processor that detects inconsistencies between the newer network routing table entry and the earlier network routing table entry, and invalidates the network entries of the newer network routing table that are inconsistent with the earlier entries. The system also includes at least one processor that reconstructs the routing structure by replacing the invalidated network routing table entries with new routing table entries that minimize violation of the invariant protocols.

Also disclosed is a computer program product comprising computer usable medium having a computer usable program code for detecting and correcting invalid network paths in a network having a plurality of routers and a set of global invariant rules imbedded in the network having computer usable medium for querying a subset of the routing table wherein said subset includes a plurality of routing table entries and computer usable medium for comparing an older routing table entry with at least one newer routing table entry in the network. The computer program product also includes a computer usable medium for detecting inconsistencies between the newer network routing table entry and the earlier network routing table entry and computer usable medium for invalidating the network entries of the newer network routing table that are inconsistent with the earlier entries. The computer program product also includes a computer usable medium for reconstructing the routing structure by replacing the invalidated network routing table entries with new routing table entries that minimize violation of the invariant rules.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

It will be understood that each block of the flowchart illustrations and block diagrams and combinations of those blocks can be implemented by computer program instructions and/or means.

Figure 1:
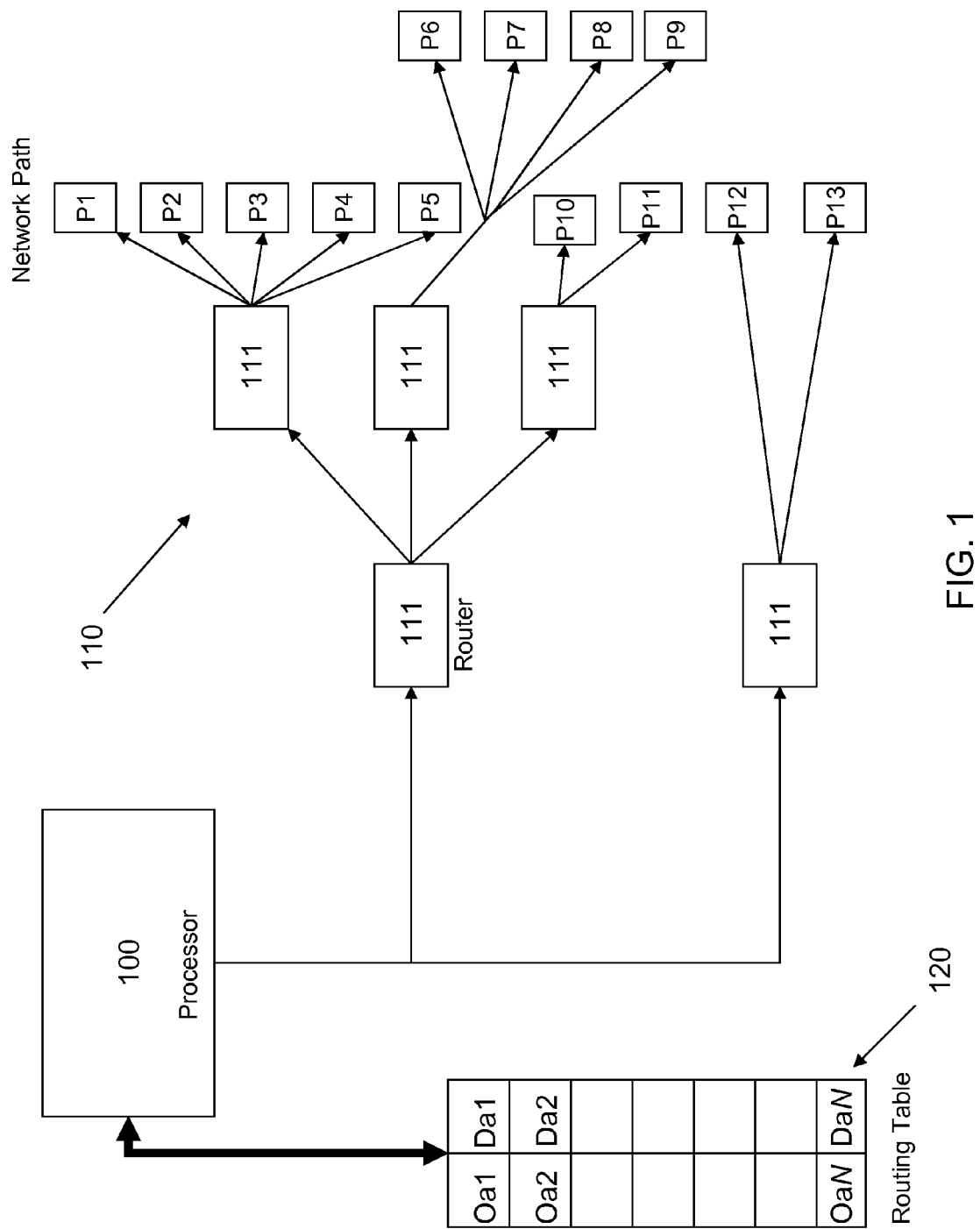
FIG. 1 illustrates an example embodiment of a system on which the disclosed invention may be practiced.

Referring now to the figures were like reference numbers denote like elements FIG. 1 shows an example embodiment of a system on which the invention may practiced.

FIG. 1 shows a processor 100 that is coupled to a network 110 featuring a plurality of nodes and routers 111. Processor 100 constructs the routing table 120 from information collected from the network routers. The routing tables 120 may be stored elsewhere in the computer. The processor 100 queries the network routers 111 and retrieves route information from said router populating the routing table. The route information includes an originating point and a destination point defining a network path. The disclosed methods and systems assume that a data packet will follow the shortest path to the destination address.

Figure 2:
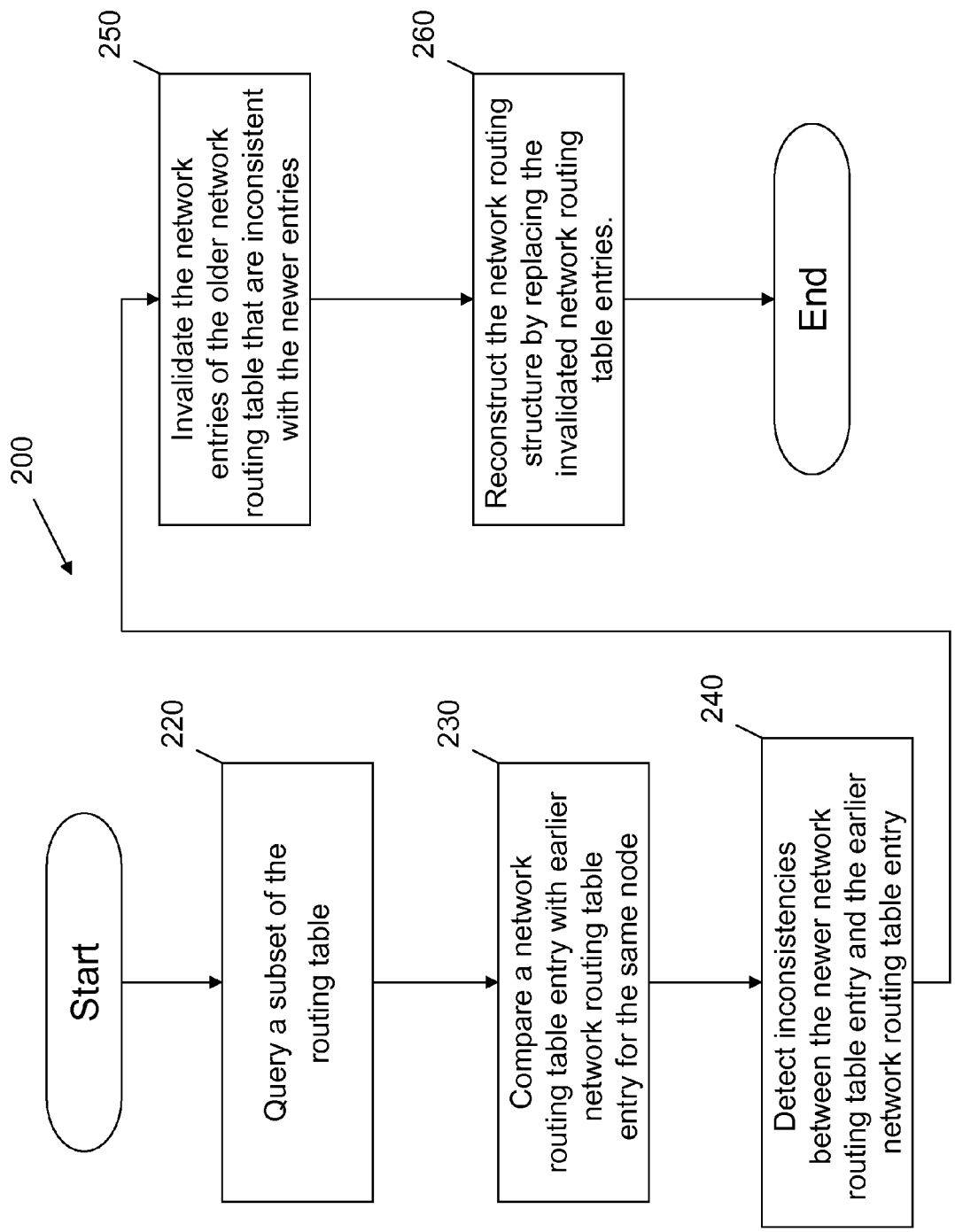
FIG. 2 illustrates a flowchart for an example embodiment of a method for detecting and filtering invalid network paths in a network.

Referring now to FIG. 2, which shows a flowchart 200 of an example embodiment of a method for detecting and correcting invalid network paths in a network. The method for detecting and correcting invalid network paths in a network having a plurality of routers and a set of global invariant rules imbedded in the network includes querying a subset of a routing table 220 defining network paths wherein said subset includes a plurality of routing table entries. The invariant rules are system requirements based on the inherent physical properties designed and incorporated into the network.

A network can have thousands of routers, maintaining thousands of nodes in its physical topology. Thus routing tables can be multiple thousands of entries long. Querying the routers in mass to construct a complete map of the physical topology of a network can expend a considerable chunk of the computing resources available. By querying the routing tables in subsets, or smaller quantities, the network topology defined by the routing tables is constantly updated while preserving a system's computing resources.

With continued reference to FIG. 2, the method then compares at least one newer network routing table entry 230 to the older network routing table entries in the network, and detects the inconsistencies 240 between the newer network routing table entry and the earlier network routing table entry. Older network entries contained in the older routing table which are inconsistent with the newer network entries are considered to be questionable and are invalidated 250. Invalidating a routing table entry simply invalidates the segment of the path defined by that particular routing table entry.

The example embodiment of FIG. 2 also includes reconstructing the routing structure 260 by replacing the invalidated network routing table entries with new routing table entries that minimize violation of the invariant rules. Invariant protocols or invariant rules are a set of requirements or protocols for the network paths that are incorporated into the global routing structure of the network. Invariant rules are the physical system requirements for each network pathway based on the inherent physical properties designed and incorporated into the global network structure.

Figure 3:
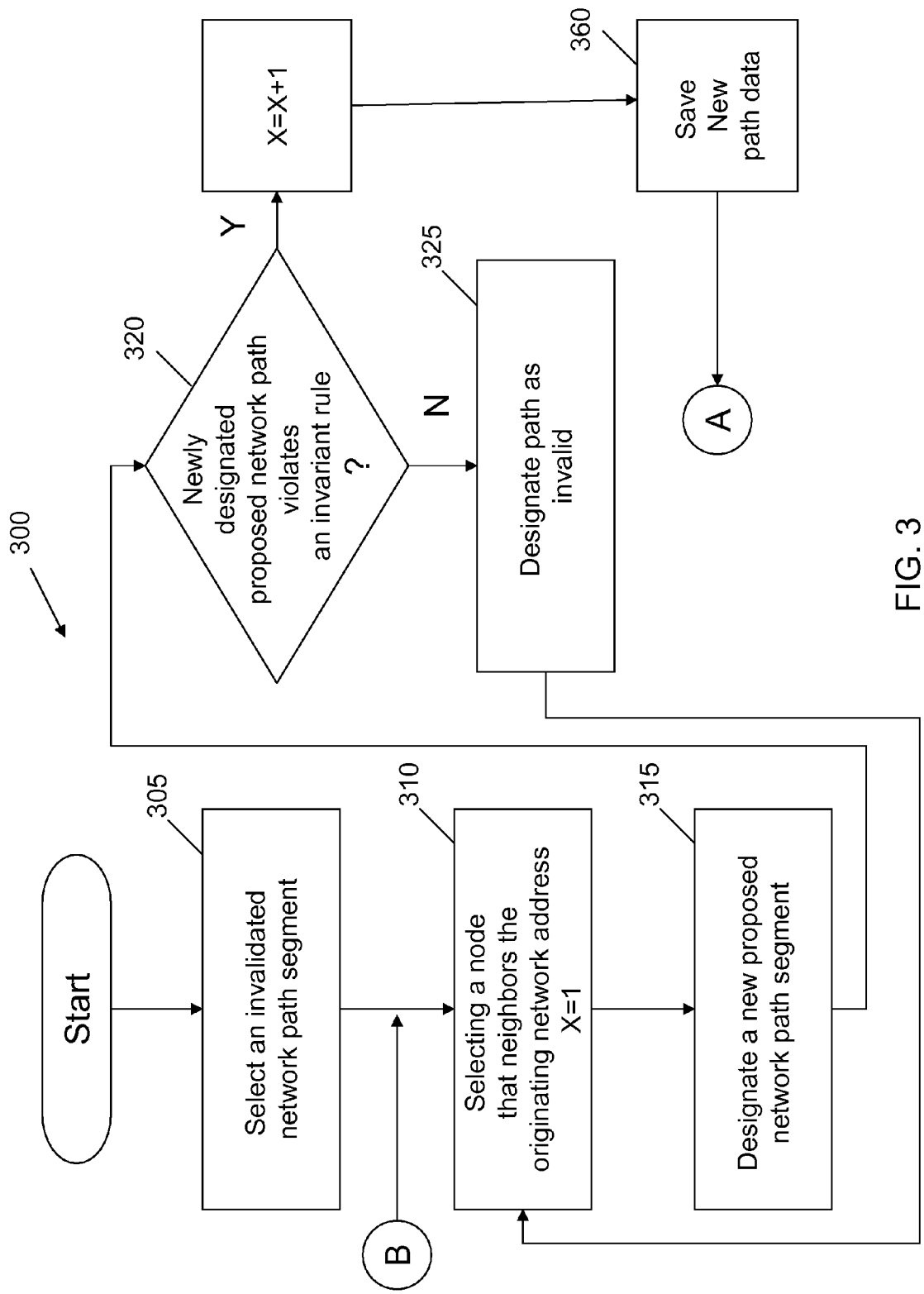
FIG. 3 illustrates a flowchart of an example embodiment of an algorithm for reconstructing the routing structure of an invalidated network path.
Figure 4:
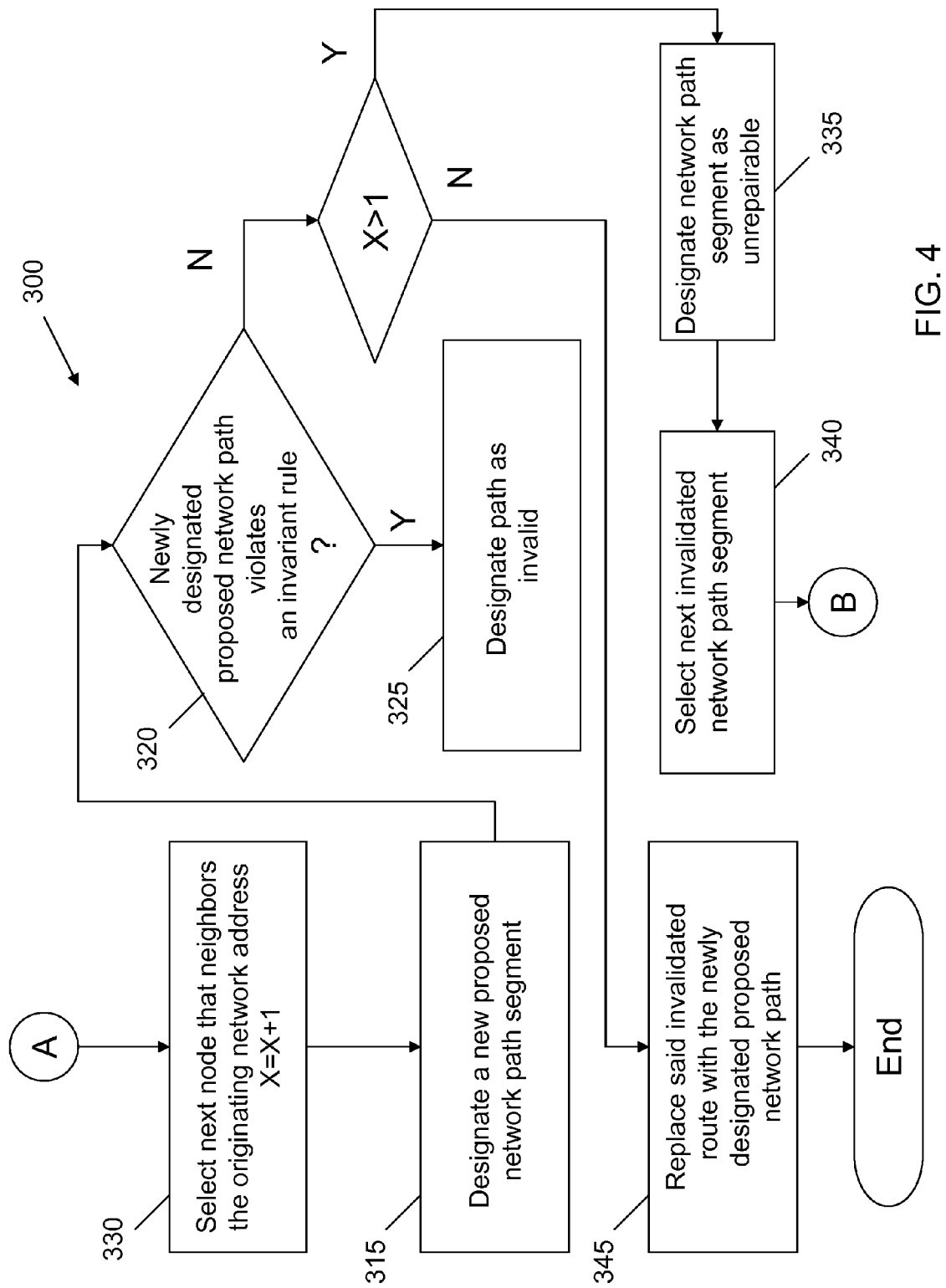
FIG. 4 illustrates a flowchart of an example embodiment of an algorithm for reconstructing the routing structure of an invalidated network path.

In the example embodiments of FIG. 2-FIG. 4 the invariant rules include the following:
1) Every destination within the network is a reachable destination;
2) Network paths contained within the global network do not loop;
3) If a second network address is along a network path from an originating network address to a destination network address, then a network path from the second network address to the destination network address is included in the network path from the originating network address to the destination network address. The global network may incorporate variations of these basic protocols, or additional protocols.

FIG. 3 and FIG. 4 illustrate an example embodiment of a flowchart for reconstructing an invalidated network path segment 300. Referring now to FIG. 3, once the invalidated segments are defined, an invalidated path is selected to be reconstructed 305. Each invalidated network entry defines a network path segment having an originating network address and a destination network address.

Once the invalidated entry is defined, the reconstruction process begins. The system sequentially selects a node that neighbors the originating network address of said invalidated network path segment and ending at the destination address of the invalidated network path segment 310. "Neighbors" the originating address means that the nodes share an IP layered connection. The particular sequence that the nodes neighboring the invalidated segment are selected is not limiting to this invention.

After selecting a neighboring node, the system designates a new proposed network path segment 315, based on the neighboring node. This is accomplished by concatenating the originating network address of the invalidated segment to the originating and destination address of the neighboring node. This defines a new proposed path from the originating network address of the invalidated segment to the destination network address for the invalidated segment.

The system next evaluates the new proposed path and determines if the newly designated proposed network path violates an invariant rule 320. If the newly designated proposed network path is determined to violate any of the invariant rules, the new proposed path is designated an invalid path 325. The system then selects the next neighboring node and proposes a new path by concatenating to originating address thereto.

Referring now to FIG. 4 with continued reference to FIG. 3, if the newly designated proposed network path is determined to comply with the invariant rules, the newly designated proposed network path is retained for future reference 360 and the next neighboring node is selected 330. After selecting the next neighboring node, the system again designates a new proposed network path segment 315, based on the neighboring node. This is accomplished by concatenating the originating network address of the invalidated segment to the originating and destination address of the neighboring node. This defines a new proposed path from the originating network address of the invalidated segment to the destination network address for the invalidated segment.

The newly proposed network path segment is evaluated to determine compliance with the invariant rules 320. If a plurality of said newly designated proposed networks paths constructed from the neighboring nodes of a particular invalidated path is determined to comply with the invariant rules, the invalidated path is determined to be and designated as unrepairable 335.

This process is repeated until the neighboring nodes are exhausted, or until it is determined that the invalidated segment can not be repaired 340. When a single newly designated proposed network path relating to a particular neighboring node is determined to comply with the invariant rules, the invalidated route is replaced with the newly designated proposed network path 345.

In yet another embodiment the invention resides in a system for detecting and correcting invalid network paths in a network having a plurality of routers and a set of global invariant rules imbedded in the network including at least one processor said processor queries a subset of a routing table data structure defining a plurality of network paths wherein said subset includes a plurality of routing table entries and comparing at least one newer network routing table entry with at least one older network routing table entry in the network. The system also includes a processor that detects inconsistencies between the newer network routing table entry and the earlier network routing table entry, and invalidates the network entries of the newer network routing table that are inconsistent with the earlier entries. The system also includes at least one processor that reconstructs the routing structure by replacing the invalidated network routing table entries with new routing table entries that minimize violation of the invariant rules.

In yet another embodiment the invention may take the form of a method for detecting and correcting invalid network paths in a network having a plurality of routers and a set of global invariant rules imbedded in the network including querying a subset of routing table entries defining network paths wherein said subset includes a plurality of routing table entries and comparing a network routing table entry with an earlier network routing table entry for the same node. The method also includes comparing the network routing table entries with local events in the network. The method includes detecting inconsistencies between the routing table entries and the local events in the network and invalidating the network entries that are inconsistent with the local events in the network.

The method also includes detecting inconsistencies between the newer network routing table entry and the earlier network routing table entry, and invalidating the network entries of the older network routing table that are inconsistent with the earlier entries. The method also includes reconstructing the routing structure by replacing the invalidated network routing table entries with new routing table entries that minimize violation of the invariant protocols.

The disclosed invention can take the form of an entirely hardware embodiment, an entirely software embodiment or an embodiment containing both hardware and software elements. In at least one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory, (CD-ROM), compact disk-read/write (CD-R/W) and DVD.

A data processing system suitable for storing and/or executing program code will include at least one processor coupled directly or indirectly to memory elements through a system bus. The memory elements can include a local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In yet another example embodiment the invention takes the form of a computer program product having a computer usable medium including computer usable program code for detecting and filtering invalid network paths in a network having a plurality of routers and a set of global invariant rules imbedded in the network having computer usable medium for querying a subset of the routing table data structure wherein said subset includes a plurality of routing table entries and computer usable medium for comparing a network routing table entry with an earlier network routing table entry for the same node. The computer program product also includes a computer usable medium for detecting inconsistencies between the newer network routing table entry and the earlier network routing table entry and computer usable medium for invalidating the network entries of the newer network routing table that are inconsistent with the earlier entries. The computer program product also includes a computer usable medium for reconstructing the routing structure by replacing the invalidated network routing table entries with new routing table entries that minimize violation of the invariant rules.

In yet another example embodiment the invention can take the form of a system for detecting and correcting invalid network paths in a network having a plurality of routers and a set of global invariant rules imbedded in the network including means for querying a subset of the routing table wherein said subset includes a plurality of routing table entries and means for comparing an older routing table entry with at least one newer routing table entry in the network. The system also includes means for detecting inconsistencies between the newer network routing table entry and the earlier network routing table entry and means for invalidating the network entries of the newer network routing table that are inconsistent with the earlier entries. In addition, the system includes means for reconstructing the routing structure by replacing the invalidated network routing table entries with new routing table entries that minimize violation of the invariant rules.

Although specific example embodiments have been illustrated and described herein, those of ordinary skill in the art appreciate that other variations, aspects, or embodiments may be contemplated, and/or practiced without departing from the scope or the spirit of the appended claims.

The invention claimed is:

1. A method for detecting and correcting invalid network paths in a computer network having a plurality of routers and a set of global invariant rules imbedded in the network comprising:
   querying, on a computer, a subset of a routing table data structure defining network paths wherein said subset includes a plurality of routing table entries;
   comparing an earlier routing table entry with at least one newer routing table entry in the network;
   detecting inconsistencies between the newer network routing table entry and the older network routing table entry;
   invalidating the network entries of the older network routing table data structure that are inconsistent with the newer entries;

reconstructing, on a computer, the routing table data structure by replacing the invalidated network routing table entries with new routing table entries that minimize violation of the invariant rules wherein said reconstructing the routing table data structure comprises:

selecting an invalidated network path segment, wherein said invalidated network path segment has an originating network address and a destination network address;

sequentially selecting a node that neighbors the originating network address of said invalidated network path segment and ending at the destination address of the invalidated network path segment;

designating a new proposed network path segment by concatenating the originating network address of said invalidated segment to the neighboring node sequentially selected defining a proposed path from said originating network address to said destination network address;

determining if said newly designated proposed network path violates an invariant rule; and designating said path as invalid and selecting the next neighboring node if said newly designated proposed network path violates an invariant rule;

designating said invalidated node as unrepairable if a plurality of said newly designated proposed network paths relating to a particular neighboring node are determined not to violate at least one invariant rule, replacing said invalidated route with said newly designated proposed network path only when a single newly designated proposed network path relating to a particular neighboring node is determined to comply with each invariant rule.

2. The method of claim 1 wherein said querying of said subset of said routing table structure is performed in subsets to conserve computational resources.

3. The method of claim 1 further comprising:

comparing the network routing table entries with local events in the network;

detecting inconsistencies between the routing table entries and the local events in the network; and, invalidating the network entries that are inconsistent with the local events in the network.

4. The method of claim 1 wherein said invariant rules imbedded in the global routing table structure of the network include:

every destination within the network being a reachable destination;

network paths contained within the global network do not loop;

if a second network address is along a network path from an originating network address to a destination network address, then a network path from the second network address to the destination network address is included in the network path from the originating network address to the destination network address.

5. A method for detecting and correcting invalid network paths in a computer network having a plurality of routers and a set of global invariant rules imbedded in the network comprising:

querying, on a computer, a subset of a routing table data structure defining network paths wherein said subset includes a plurality of routing table entries;

comparing an earlier routing table entry with at least one newer routing table entry in the network;

detecting inconsistencies between the newer network routing table entry and the older network routing table entry;

invalidating the network entries of the older network routing table data structure that are inconsistent with the newer entries;

reconstructing, on a computer, the routing table data structure by replacing the invalidated network routing table entries with new routing table entries that minimize violation of the invariant rules wherein said invariant rules imbedded in the global routing table structure of the network include:

every destination within the network being a reachable destination;

network paths contained within the global network do not loop;

if a second network address is along a network path from an originating network address to a destination network address, then a network path from the second network address to the destination network address is included in the network path from the originating network address to the destination network address wherein said reconstructing the routing structure comprises:

selecting an invalidated network path segment, wherein said invalidated network path segment has an originating network address and a destination network address;

sequentially selecting a node that neighbors the originating network address of said invalidated network path segment and ending at the destination address of the invalidated network path segment;

designating a new proposed network path segment by concatenating the originating network address of said invalidated segment to the neighboring node sequentially selected defining a proposed path from said originating network address to said destination network address;

determining if said newly designated proposed network path violates an invariant rule; and designating said path as invalid and selecting the next neighboring node if said newly designated proposed network path violates an invariant rule;

designating said invalidated node as unrepairable if a plurality of said newly designated proposed network paths relating to a particular neighboring node are determined not to violate at least one invariant rule, replacing said invalidated route with said newly designated proposed network path only when a single newly designated proposed network path relating to a particular neighboring node is determined to comply with each invariant rule.

6. The method of claim 5 further comprising:

comparing the network routing table entries with local events in the network;

detecting inconsistencies between the routing table entries and the local events in the network; and, invalidating the network entries that are inconsistent with the local events in the network.

7. A system for detecting and correcting invalid network paths in a computer network having a plurality of routers and a set of global invariant rules imbedded in the network comprising:

means for querying a subset of the routing table on a computer wherein said subset includes a plurality of routing table entries;

means for comparing on a computer an older routing table entry with at least one newer routing table entry in the network;

means for detecting inconsistencies between the newer network routing table entry and the earlier network routing table entry;

means for invalidating the network entries of the older network routing table that are inconsistent with the newer entries;

means for reconstructing the routing structure on a computer by replacing the invalidated network routing table entries with new routing table entries that minimize violation of the invariant rules wherein said means for reconstructing the routing structure comprises a processor for:

selecting an invalidated network path segment, wherein said invalidated network path segment has an originating network address and a destination network address;

sequentially selecting a node that neighbors the originating network address of said invalidated network path segment and ending at the destination address of the invalidated network path segment;

designating a new proposed network path segment by concatenating the originating network address of said invalidated segment to the neighboring node sequentially selected defining a proposed path from said originating network address to said destination network address;

determining if said newly designated proposed network path violates an invariant rule; and designating said path as invalid and selecting the next neighboring node if said newly designated proposed network path violates an invariant rule;

designating said invalidated node as unrepairable if a plurality of said newly designated proposed network paths relating to a particular neighboring node are determined not to violate at least one invariant rule, replacing said invalidated route with said newly designated proposed network path only when a single newly designated proposed network path relating to a particular neighboring node is determined to comply with each invariant rule.

8. The system of claim 7 wherein said means for querying a subset of said routing table structure queries a subset of said routing table to conserve computational resources.

9. The system of claim 7 wherein said means for reconstructing the routing structure further comprises a processor for:

comparing the network routing table entries with local events in the network; and detecting inconsistencies between the routing table entries and the local events in the network.

10. The system of claim 9 wherein said means for reconstructing the routing structure further comprises a processor for:

invalidating the network entries that are inconsistent with the local events in the network.

11. A computer program product comprising a non-transitory computer useable medium having a computer usable program code for detecting and correcting invalid network paths in a network having a plurality of routers and a set of global invariant rules imbedded in the network comprising:

computer useable medium for querying a subset of the routing table wherein said subset includes a plurality of routing table entries;

computer useable medium for comparing an older routing table entry with at least one newer routing table entry in the network.;

computer useable medium for detecting inconsistencies between the newer network routing table entry and the earlier network routing table entry;

computer useable medium for invalidating the network entries of the older network routing table that are inconsistent with the newer entries;

computer useable medium for reconstructing the routing structure by replacing the invalidated network routing table entries with new routing table entries that minimize violation of the invariant rules; wherein said computer useable medium for reconstructing the routing structure comprises a processor for:

selecting an invalidated network path segment, wherein said invalidated network path segment has an originating network address and a destination network address;

sequentially selecting a node that neighbors the originating network address of said invalidated network path segment and ending at the destination address of the invalidated network path segment;

designating a new proposed network path segment by concatenating the originating network address of said invalidated segment to the neighboring node sequentially selected defining a proposed path from said originating network address to said destination network address;

determining if said newly designated proposed network path violates an invariant rule; and designating said path as invalid and selecting the next neighboring node if said newly designated proposed network path violates an invariant rule;

designating said invalidated node as unrepairable if a plurality of said newly designated proposed network paths relating to a particular neighboring node are determined not to violate at least one invariant rule, replacing said invalidated route with said newly designated proposed network path only when a single newly designated proposed network path relating to a particular neighboring node is determined to comply with each invariant rule.

12. The computer program product of claim 11 further comprising:

computer usable medium for comparing the network routing table entries with local events in the network; and computer usable medium for detecting inconsistencies between the routing table entries and the local events in the network.

13. The computer program product of claim 12 further comprising:

computer usable medium for invalidating the network entries that are inconsistent with the local events in the network.

* * * * *